United States Patent [19]

Chien

[11] Patent Number: 4,890,334
[45] Date of Patent: Dec. 26, 1989

[54] BUOY STRUCTURE FOR DETECTING FISHING GROUNDS

[76] Inventor: Fong K. Chien, 5F, No. 3, Lane 359, Chung-Shan Rd., Sec. 2, Chung Ho., Taipei, Taiwan

[21] Appl. No.: 161,452

[22] Filed: Feb. 26, 1988

[51] Int. Cl.$^4$ .............................................. H04B 1/38
[52] U.S. Cl. ...................................... 455/89; 455/40; 367/3; 340/852
[58] Field of Search ...................... 455/40, 66, 89, 90; 367/3, 4; 340/852

[56] References Cited

U.S. PATENT DOCUMENTS

| | | | |
|---|---|---|---|
| 3,022,462 | 2/1962 | Keiper, Jr. | 367/3 |
| 3,230,500 | 1/1966 | Dunn | 455/40 |
| 3,803,540 | 4/1974 | Mar et al. | 367/4 |
| 3,879,697 | 4/1975 | Richard | 367/3 |

Primary Examiner—Joseph A. Orsino
Assistant Examiner—Frank M. Scutch, III
Attorney, Agent, or Firm—Lowe, Price, LeBlanc, Becker & Shur

[57] ABSTRACT

A buoy for detecting fishing grounds, mainly comprised of an upper body, a lower body, a water-proof ring, a FM antenna, a PC Board, a pad, a rechargeable battery, an insulator, an ultrasonic wave transmitting transducer, an ultrasonic wave receiving transducer, and a receiver; by means of the ultrasonic wave transmitting transducer and the ultrasonic wave receiving transducer to detect the echo of transmitted acoustic wave from fishing grounds, and by means of a receiver to display the signal received for right determination of the situation of the fishing grounds detected.

1 Claim, 3 Drawing Sheets

BUOY STRUCTURE FOR DETECTING FISHING GROUNDS

BACKGROUND OF THE INVENTION

The present invention relates to a buoy structure for detecting fishing grounds and more particularly a buoy that detects the fishing grounds therebelow by means of ultrasonic wave transmitting transducer and ultrasonic wave receiving transducer, by means of the time required for the sound wave echo detected and through the control of an PC board to produce an audible acoustic frequency, the signal of said acoustic frequency is then transmitted by a FM transmitter through a FM antenna of a mark rod and the signal thus transmitted is then received by the fishermen from a receiver through FM antenna; by means of the change of the frequency received to determine the situation of fishing grounds and to take up the fishing rod or from the display of the receiver to see the distribution of fishing grounds for fruitful fishing.

SUMMARY OF THE INVENTION

The present invention is to provide a buoy structure for detecting fishing grounds, mainly comprised of an upper body, a lower body, a water-proof ring, a FM antenna, a PC Board, a pad, a rechargeable battery, an insulator, an ultrasonic wave transmitting transducer, an ultrasonic wave receiving transducer, and a receiver, by means of the ultrasonic wave transmitting transducer and the ultrasonic wave receiving transducer to detect the echo of acoustic wave from fishing grounds, said echo of acoustic wave is then detected, amplified, integrated. and turned to DC voltage for output, the output thus produced runs through voltage control frequency output and FM transmitter and finally transmitted through the FM antenna of the mark rod; the signal thus transmitted is then received by receiver for location determination of the right fishing grounds.

BRIEF DESCRIPTION OF THE DRAWINGS

FIG. 1A is a detailed fragmentary cross sectional view of the threaded joint between the upper and lower bodies of FIG. 1.

DESCRIPTION OF THE PREFERRED EMBODIMENTS

Figure 1:
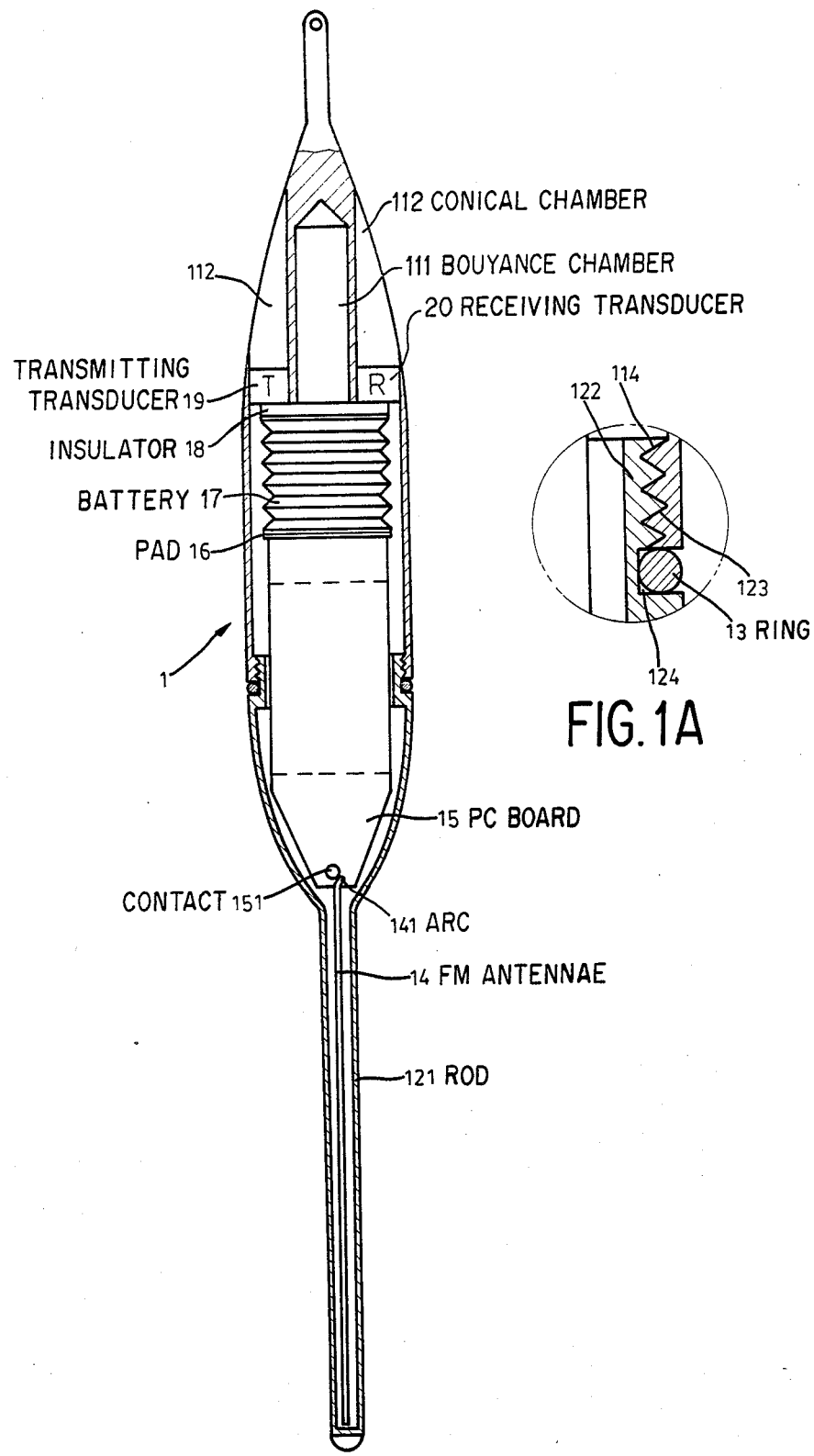
FIG. 1 is a plan sectional view of a buoy embodying the present invention.
Figure 2:
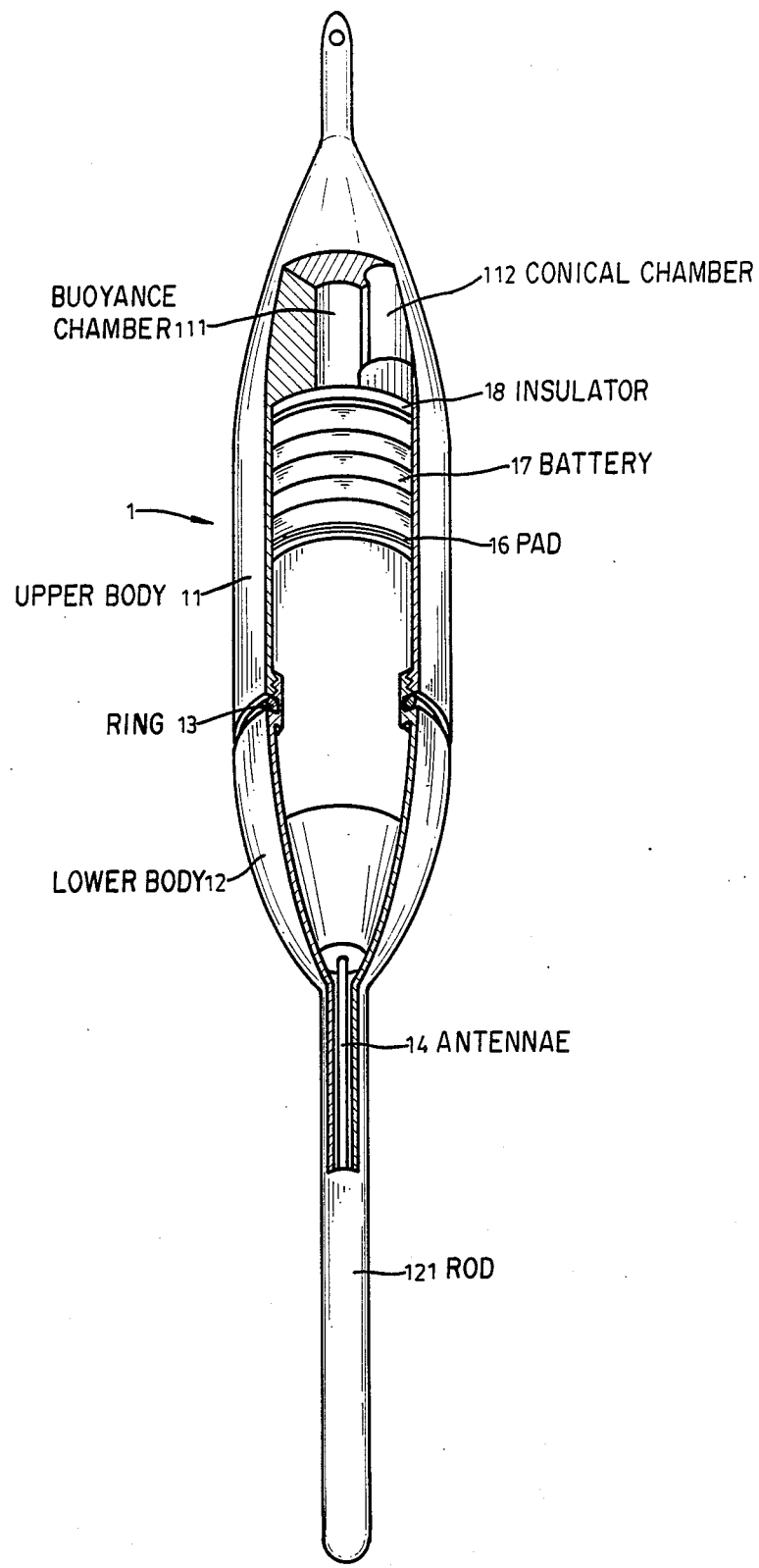
FIG. 2 is a perspective view of the preferred embodiment.

Please refer to the plan sectional view and the perspective view of the present invention as respectively shown in FIG. 1 and FIG. 2, wherein the buoy 1 of the present invention is mainly comprised of an upper body 11, an lower body 12, a water-proof ring 13, a FM antenna 14, an PC Board 15, a pad 16, a rechargeable battery 17, an insulator 18, an ultrasonic wave transmitting transducer 19, and an ultrasonic wave receiving transducer 20 to form a buoy structure for detecting fishing grounds. Said upper body 11 comprises a buoyance adjusting chamber 111 in the center which comprises a cone opening and an inner thread at the other end. Said lower body 12 comprises a hollow mark rod 121 at one end and an inner flange 122 at the other end, said inner flange 122 comprises an outer thread 123, and the inner side of the outer thread 123 forms a recess 124.

Said water-proof ring 13 is to slide over the recess 124 of the lower body 12 to protect the threaded part of the upper boy 11 and the lower body 12 from water permeation. Said FM antenna 14 has an arch face 141 at one end to superiorly pressure at the contact point 151 of the PC Board 15.

When to assemble the present invention, place a proper number of lead balls into the buoyance adjusting chamber 111, place in the cone opening an ultrasonic wave transmitting transducer 19 and an ultrasonic wave receiving transducer 20 where they are combined together as one unit, place an insulator 18 on the outer side of the cone opening 112 and the buoyance adjusting chamber 111, place a rechargeable battery 17 between the insulator 18 and a pad 16 letting the pad 16 be in contact with the PC Board 15 at the other end, arrange the PC Board 15 letting its contact point 151 be in contact with the arch face 141 of the FM antenna, place the FM antenna 14 on the inner side of the mark rod 121, then screw up the upper body 11 and the lower body 12 by means of the inner thread 114 and the outer thread 123 to form an unit letting PC Board 15, pad 16, rechargeable battery 17 and insulator 18 be located between the upper body 11 and the lower body 12.

When the upper body 11 and the lower body 12 is screwed up together, the water-proof ring 13 at the recess 124 is then squeezed therebetween to provide water-proof effect.

The buoyance adjusting chamber 111 of the buoy 1 is for placing lead balls thereinto or taking the placed lead balls therefrom to adjust the buoyance required.

Figure 3:
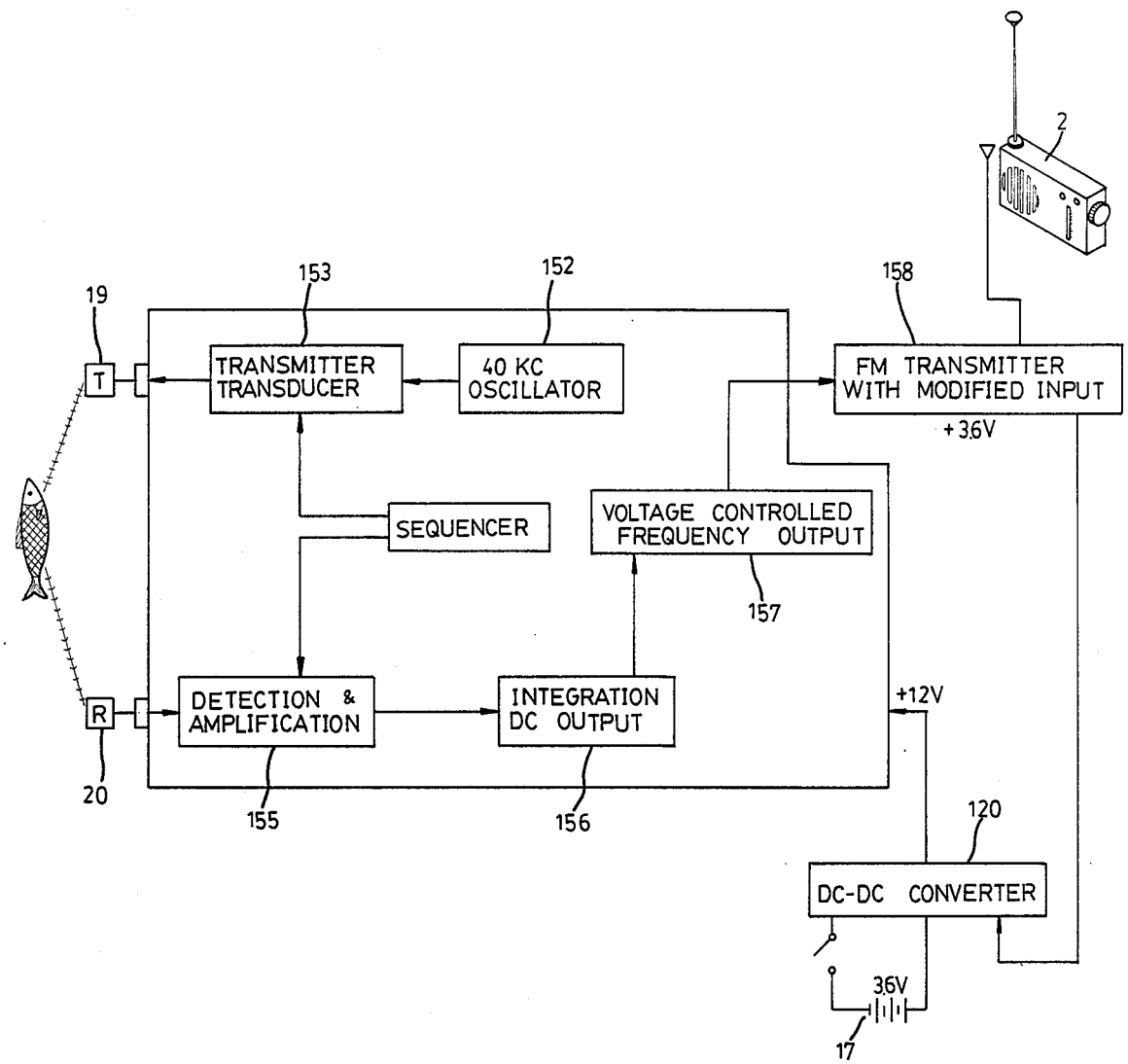
FIG. 3 is a block diagram of the PC Board of the preferred embodiment.

FIG. 3 shows a block diagram of the PC Board of the present invention. In the present invention, 40 kc oscillator is oscillating through transmitter driver 153, by means of time sequencer 154 to control the time (approx. 0.5 M/S) of the transmitter driver 153, then the transmitter driver 153 drives the ultrasonic wave transmitting transducer 19 to transmit water, and the situation of the fishing grounds.

I claim:

1. A buoy structure for detecting fishing grounds comprising:

an upper body defining an internal centrally located buoyancy adjusting chamber and a conical chamber at one end thereof;

an ultrasonic wave transmitting transducer and an ultrasonic wave receiving transducer disposed in a conical chamber;

an insulator disposed between the conical chamber and buoyancy adjusting chamber, and the opposite end of said body, and an inner thread at the opposite end;

a lower body having a rod-like extension at one end and an FM antenna mounted in the extension with an end of said antenna extending from the extension into said body and forming an arc, the end of said body opposite the extension mounting an inner flange having outer threads thereon and a waterproof ring slidably mounted over said flange;

a PC board mounted in said lower body having a contact point at one end in contact with the arc of the FM antenna, and the opposite end of said PC board mounting a pad and a rechargeable battery;

said lower body end being threadedly received in said upper body end so that the battery will be disposed between said pad and said insulator;

means for transmitting an ultrasonic wave from said transmitting transducer and for receiving the echo of the sound wave transmitted at said receiving transducer;

means for detecting, amplifying and integrating the echo to produce a DC voltage output and for producing from said output a signal of acoustic frequency being transmitted through the FM antenna whereby when the upper and lower bodies are assembled in threaded engagement, a buoy will be produced which can transmit a signal for determining the status of a fishing ground.

* * * * *